United States Patent [19]

Pires

[11] 4,180,829
[45] Dec. 25, 1979

[54] TELEVISION SIGNAL PHASE MATCHING APPARATUS AND METHOD

[75] Inventor: H. George Pires, Parlin, N.J.
[73] Assignee: Crosspoint Latch Corp., Summit, N.J.
[21] Appl. No.: 855,006
[22] Filed: Nov. 25, 1977
[51] Int. Cl.² .............................................. H04N 9/62
[52] U.S. Cl. .................................. 358/10; 358/139; 358/185
[58] Field of Search .......................... 358/10, 139, 185

[56] References Cited

U.S. PATENT DOCUMENTS 3,958,269  5/1976  Davis .................................. 358/10

OTHER PUBLICATIONS

"Measurement Techniques in Television Studios etc.", The Radio and Electronic Engineer, Tecar et al., vol. 41, No. 3, Mar. 1971, pp. 113-125.

Primary Examiner—Richard Murray
Attorney, Agent, or Firm—Marianne Rich

[57] ABSTRACT

For phase matching a first and second television signal, both signals are applied to the inputs of an electronic switching circuit, whose output is connected to a standard television monitor. The switching circuit applies the video portion of the first television signal to the monitor. For matching the phase of the synchronizing signals, the synchronizing signals from the first television signal are applied to the monitor for the first half of each field, those from the second television signal during the second half of each field. A visually detectable shift occurs between the top and bottom half of the picture displayed on the monitor if the synchronizing signals of the second television signal are not in phase with those of the first television signal. Similarly for color television signals, the video and synchronizing portions of the first television signal are applied to the monitor throughout each field while the color burst from the first television signal is applied for the first half of each field and that from the second television signal for the second half of each field. If the two color burst are not exactly in phase, the hue of the pictured display on the monitor will differ between the top and bottom half. Manual adjustment of the phase of the synchronizing signals or the color burst to eliminate the shift or the difference in hue, respectively, will cause the second television signal to be phased-matched with the first.

15 Claims, 11 Drawing Figures

FIG.1
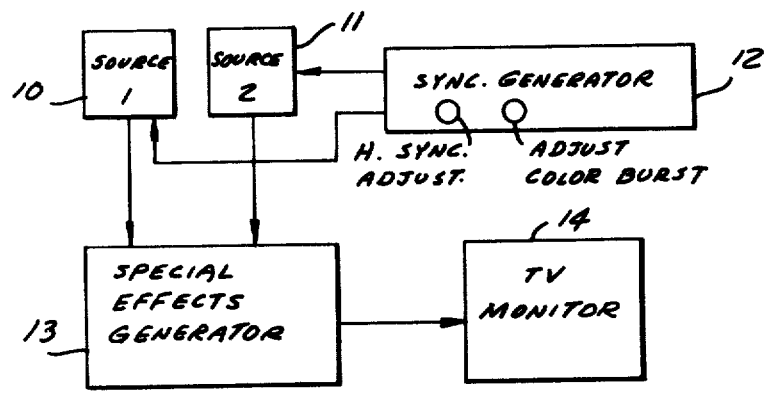
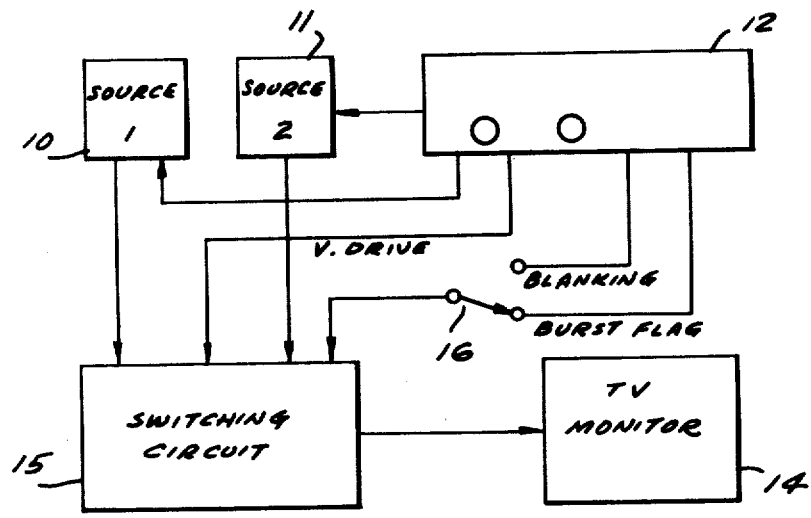
FIG.2

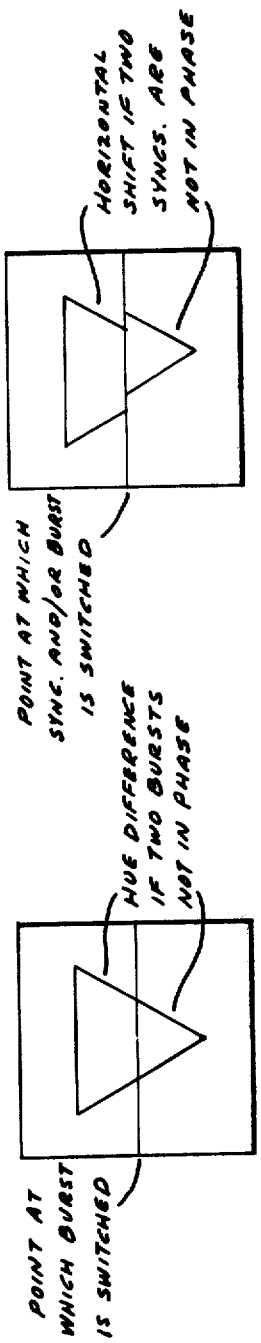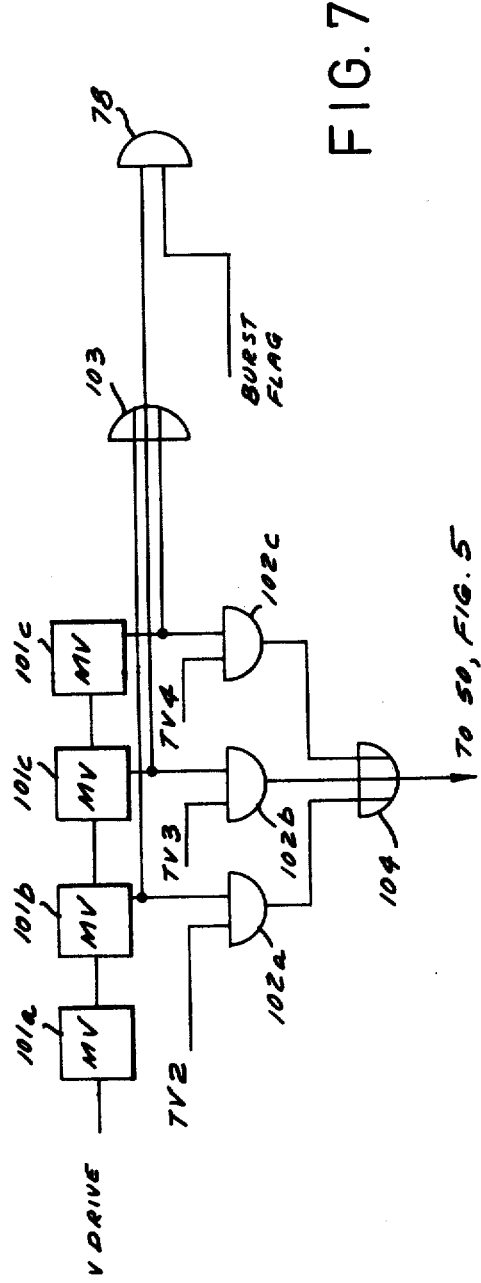

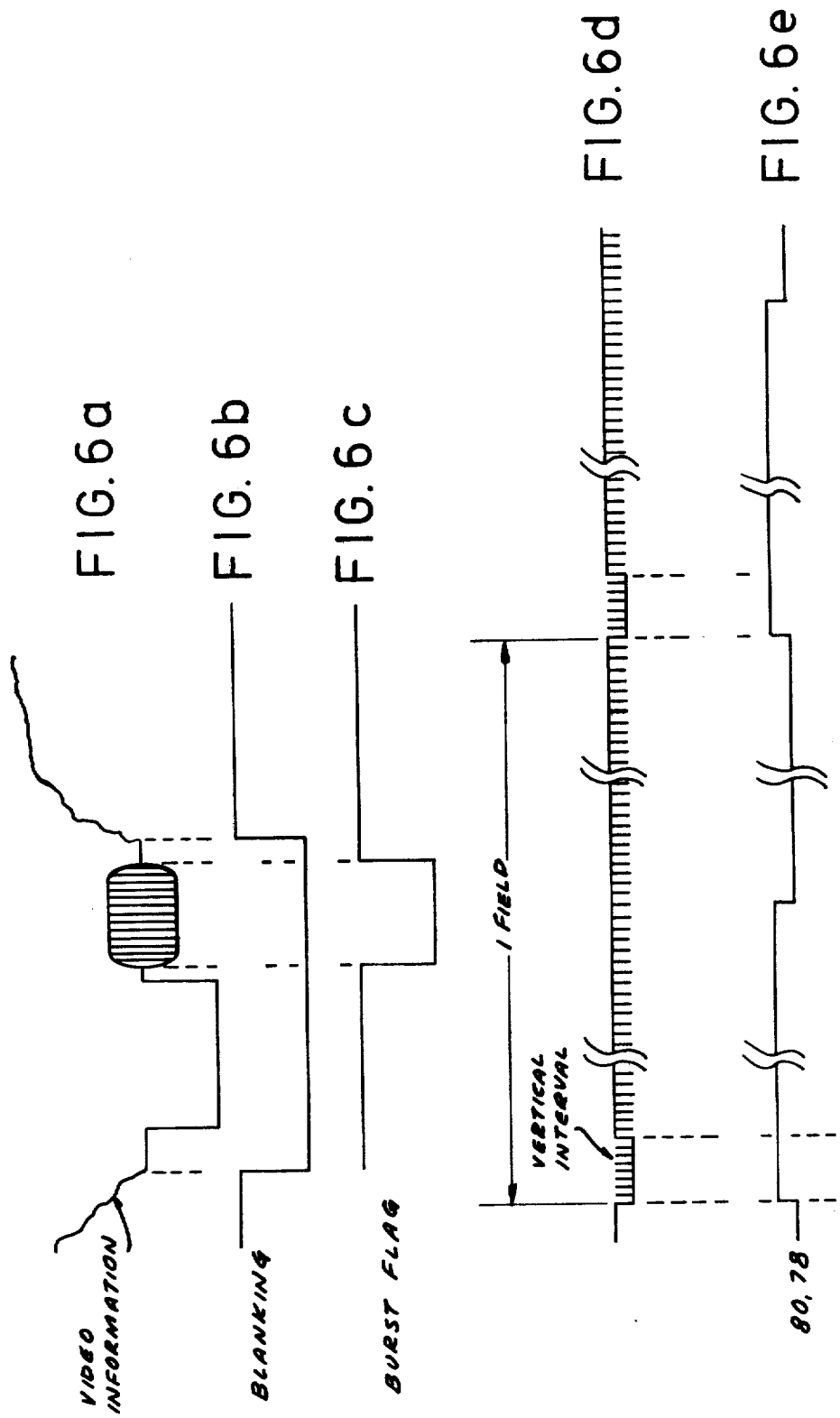

TELEVISION SIGNAL PHASE MATCHING APPARATUS AND METHOD

BACKGROUND OF THE INVENTION

The present invention relates to television systems and more particularly to television systems wherein signals from two or more sources are mixed. For the mixing, a unit called a special effects generator is used. In order for this unit to operate properly, it is very important that these signals are timed very accurately with respect to one another at the point in which they enter the special effects generator. Specifically, if the color burst of one signal does not have the same phase as the other, a difference in hue will result. Similarly, if the synchronizing signals of one television signal are out of phase with one another, a shift in the horizontal position of the picture created by one signal relative to that of the other will result. To prevent both of these difficulties an exact phase match is necessary. A vectorscope is usually used for this purpose. The color bursts of each television signal are applied in turn to the input of the vectorscope. For each, the position of a spot on the vectorscope display is noted. When the spots resulting from the two signals are in the same position the color bursts of the two signals are phase-matched. Similarly, the horizontal synchronizing signals can be applied to the vectorscope and their relative phase adjusted to meet the same criterion. In this known method, the spots on the vectorscope whose position is indicative of the phase of the applied signals are not visible simultaneously. Further, although the results obtained are extremely accurate the vectorscope is very expensive, not owned by many small studios, and is usually not available in a portable television system.

As a prior art statement, application wishes to say that he is not aware at this time of any method or system for phase matching signals from a plurality of television sources, closer to the present invention than the method and system utilizing a vectorscope as described above.

SUMMARY OF THE INVENTION

It is an object of the present invention to furnish a method and system for phase matching the synchronizing signals from a plurality of television signal sources. The term "synchronizing signals" for the purposes of this invention, includes the color bursts in case of color signals.

It is the further object of this invention to provide such a phase matching system and method which is accurate, but requires considerably less equipment than known methods and is easy to carry out even in a portable television system.

The present invention relates to a television system having means for supplying a first and second television signal, each adapted for display as a sequence of successive fields, each having synchronizing signals, said system further having display means for furnishing a display having predetermined characteristic varying as a function of the phase of signals applied thereto. The present invention is a method for furnishing a visual indication of phase difference between synchronizing signals of said first and second television signal and comprises the steps of applying said synchronizing signals of said first television signal to said display means during a first predetermined part of each of a plurality of sequential time intervals, and blocking the application of said synchronizing signals of said first television signals to said display means during a second predetermined part of each of said time intervals and applying instead said synchronizing signals of said second television signal, said sequential time intervals having a duration such that changes of said predetermined characteristic of said display caused by said synchronizing signals of said first and second television signal are visible simultaneously.

In a preferred embodiment of the invention, the display means comprises monitoring means for furnishing a display of video information signals under control of synchronizing signals applied thereto, and the successive time intervals comprise a plurality of successive fields of said television signals. The method of this invention then further comprises the step of applying said video information signals of said first television signal to said monitoring means throughout each of said successive time intervals, whereby a visually detectable difference is created between a first and second part of said display corresponding, respectively, to said first and second part of said plurality of successive time intervals if a phase difference exists between said synchronizing signals of said first and second television signals.

In a preferred embodiment of the present invention the television system comprises means for changing the phase of at least one of said television signals. The method of the invention further comprises the step of manually operating said phase changing means in a direction decreasing said visually detectable difference.

The system of the present invention is a television phase matching system which comprises means for furnishing a first and second television signal each having video information signals and synchronizing signals, each adapted for display as a sequence of successive fields. The system further comprises display means for furnishing a display having a predetermined characteristic varying as a function of the phase of signals applied thereto. Finally, connecting means are furnished for applying synchronizing signals of said first television signal to said display means during a first predetermined part of a plurality of successive time intervals, and blocking the application of said synchronizing signals of said first television signal to said display means during a second predetermined part of each of said time intervals and applying instead said synchronizing signals of said second television signal, each of said successive time intervals having a duration such that changes of said predetermined characteristic of said display caused by said synchronizing signals of said first and second television signal are visible simultaneously.

In a preferred embodiment, the display means comprises monitoring means for furnishing a display of video information signals under control of synchronizing signals applied thereto, and each of said successive time intervals is a field of said television signal. In this embodiment, the connecting means comprise means for applying said video information signals of said first television signal to said monitoring means during said first and second parts of said plurality of successive fields, whereby a visually detectable difference is created between a first and second part of said display corresponding, respectively, to said first and second predetermined parts of said successive fields if a phase difference exists between said synchronizing signals of said first and second television signal.

In a preferred embodiment of the present invention the connecting means block the application of color bursts of said first television signal to said monitoring means during said second predetermined parts of said successive fields and apply instead color bursts of said second television signal. The visually detectable difference in said display is then a difference in the hue.

In a second preferred embodiment the connecting means operate to block the application of horizontal synchronizing signals of said first television to said monitoring means during said second predetermined part of said successive fields and apply instead the horizontal synchronizing signals of said second television signal. The visually detectable difference in said display is then a horizontal shift between a first and second part of said display corresponding respectively to said first and second predetermined part of said successive fields if a phase difference exists between horizontal synchronizing signals of said first and second television signals.

In a further preferred embodiment, means are provided for changing the phase of at least one of said television signals relative to the other. In response to said visually detectable difference, the phase changing means is then operated in a direction decreasing said visually detectable difference.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 shows a system for mixing two television signals, which requires exact synchronization of the signals being mixed;

FIG. 2 is a block diagram one embodiment of the phase matching system of the present invention;

FIG. 3 shows the display appearing on the color monitor if the color bursts from the first and second television signals are not in phase;

FIG. 4 shows the display on the monitor if the horizontal synchronizing signals of the first and second television signals are not in phase;

Figure 5:
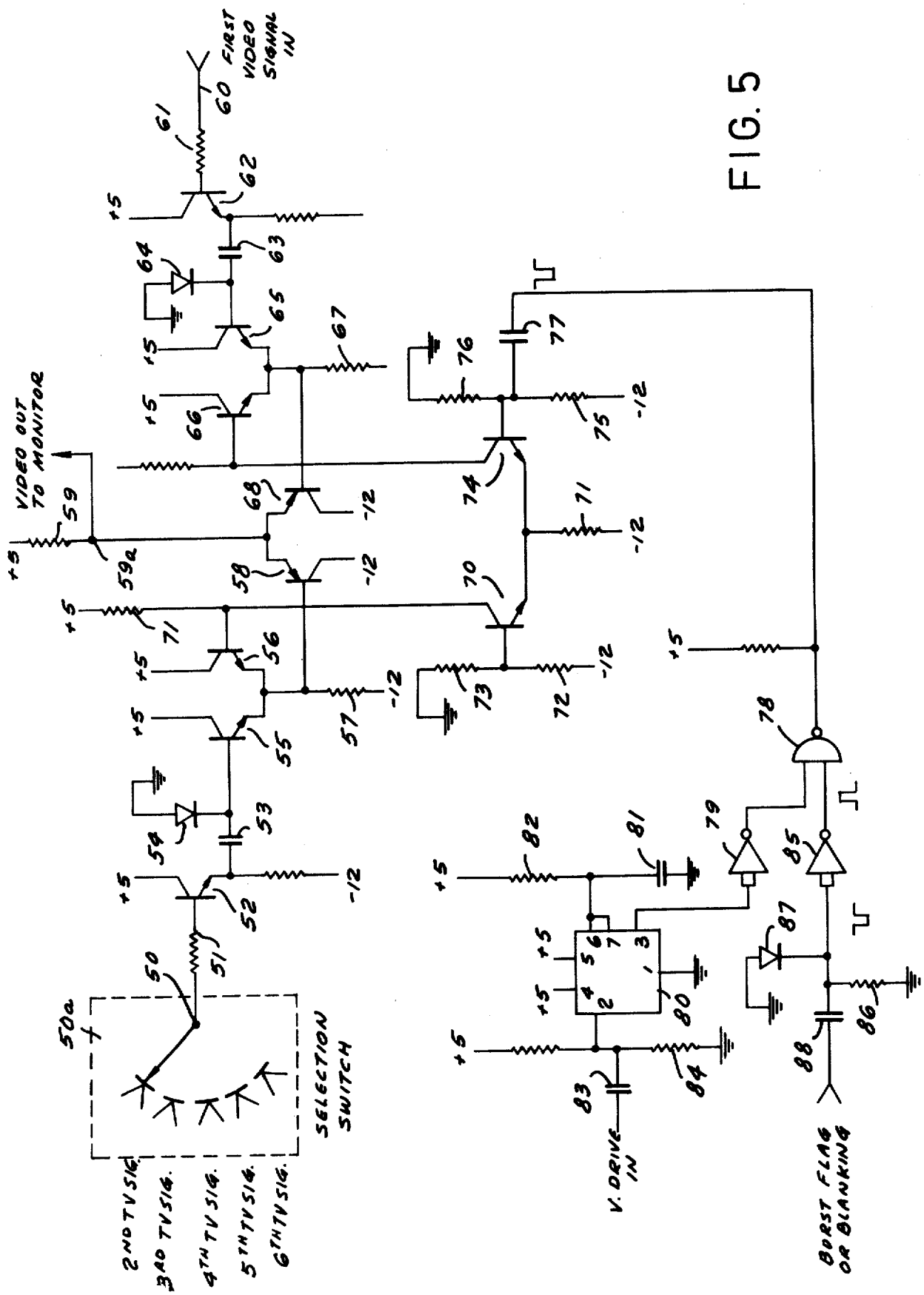
FIG. 5 is a schematic diagram of the switching circuit of FIG. 2.

FIGS. 6a–e are a waveform diagram illustrating the operation of the circuit of FIG. 5; and FIG. 7 is a schematic diagram of a switching circuit for synchronizing four television signals and

DESCRIPTION OF THE PREFERRED EMBODIMENT

The equipment at the sending end of a known television system is shown in FIG. 1. Synchronizing signals, including horizontal and vertical synchronizing signals and, for color television signals, color burst, are applied to the video signals furnished by video signal generators 10 and 11 by synchronizing signal generator 12. Specifically, the synchronizing signal generator has at least two channels, one for each source, and supplies horizontal and vertical synchronizing signals and, for color systems, color bursts, on each of the channels. The synchronizing signal generator has phase adjustment means for separately adjusting the phase of the horizontal synchronizing signals and of the color burst in at least one of the channels. If more than two video signal sources are to be utilizing the synchronizing signal generator must of course have more than two channels. In that case phase adjustments must be present for each additional channel.

The first and second television signal resulting from the combination of the video information signals with the synchronizing signals are applied to a special effects generator 13 whose function it is to mix them as required by the program. A television monitor 14 is supplied for viewing the display (television picture) created by the special effects generator.

If a phase shift exists between the synchronizing signals (which include the color bursts) of the two television signals at the point in which they both enter the special effects generator, either due to phase shifts between the two channels of synchronizing signal generator 12 or because of different line lengths connecting video signal source 10 and video signal source 11 to the special effects generator, the latter cannot operate correctly to give the desired effects.

The apparatus of the present invention is designed to synchronize the signals from sources 10 and 11 at the input of the special effects generator as shown in FIG. 2. Where elements shown on FIG. 2 are the same as those in FIG. 1, the same reference numerals are used. Synchronizing signal generator 12 has, in addition to the output shown in FIG. 1, a "vertical drive" output, a "blanking" output and a "burst flag" output. The "vertical drive" output is connected to an input of the switching circuit 15, which also receives the first and second television signal, namely the video information signals furnished by sources 10 and 11 to which the required synchronizing signals have been added by synchronizing signal generator 12. Switching circuit 15 has a further input to which is connected the output of a selector switch 16. Selector switch 16 connects either the "burst flag" output or the "blanking" output of synchronizing signal generator 12 to switching circuit 15. For the position of selector switch 16 shown on FIG. 2, the "burst flag" output is connected to switching circuit 15 and monitor 14 must be a color monitor. The television signals furnished by sources 1 and 2 are color television signals.

The operation of the above-described circuit is as follows: Switching circuit 15 (shown in greater detail in FIG. 5) first allows the video information and synchronizing signals of the first television signal to be applied to monitor 14. For the first half of the field, the color bursts of the first television signal are also fed to the monitor. However, for the second half of the field the electronic switch blocks the color bursts of the first television signal and instead applies the color bursts of the second televison signal to monitor 14. The circuitry within monitor 14 causes the color display on its display surface to be referenced to the color bursts being applied to the monitor. If the two incoming bursts do not have the same phase, the lower half of the picture displayed on the monitor will have a different hue than that of the upper half. The change in color will occur exactly at the point at which one set of bursts is substituted for the other. This is illustrated in FIG. 3 which shows the display on the color monitor. The dividing line indicates the point at which the bursts have been switched from these of the first to those of the second television signal. The upper and lower halves of the display will have different hues if the two bursts are not in the phase.

If now selector switch 16 is moved to the position where the "blanking" output of synchronizing signal generator 12 is applied to the switching circuit, in addition to the difference in hue the display will show a horizontal shift between the upper and lower half as shown in FIG. 4, if the horizontal synchronizing signals of the first and second television signal are not in phase. Again, the shift occurs at the point at which the synchronizing signals are switched.

The "vertical drive" "blanking" and "burst flag" outputs of synchronizing signal generator 12 will be discussed in greater detail below. First, however, the details of switching circuit 15 will be discussed with reference to FIG. 5.

Referring now to FIG. 5, the second television signal is applied at a terminal 50, through a resistor 51 to the base of transistor 52 which is connected as an emitter-follower circuit. A capacitor 53 has one terminal connected to the emitter of transistor 52 and a second terminal connected to the cathode of a diode 54 whose anode is connected to ground potential. The capacitor-diode circuit constitutes a DC restoration circuit, clamping the tips of the synchronizing signals at approximately −0.7 volts. The common point of capacitor 53 and diode 54 is connected to the base of a transistor 55. The collector of transistor 55 is connected to a source of positive voltage while its emitter is connected through a resistor 57 to a source of negative potential. The emitter-collector circuit of a transistor 56 is connected in parallel with that of transistor 55. Transistor 55 and 56 form part of the actual switching circuit, as does a transistor 58 whose base is connected to the emitters of transistors 55 and 56. The emitter of transistor 58 is connected through a resistor 59 to the source of positive potential, while its collector is connected to a source of negative potential. The switching output to the display means is derived from a terminal 59a which is connected to the emitter of transistor 58.

The first television signal is applied at a terminal 60 and passes through a circuit identical to that described above with reference to the first television signal, except that the components are numbered in the 60's. Transistors 65 and 66 also form part of the switching circuit proper and a transistor 68 is connected in parallel with transistor 58.

A transistor 70 constitutes the driving circuit for the half of the electronic switch assigned to the second television signal. Specifically, its emitter-circuit is connected to the base of transistor 56 and, through a resistor 71, to the source of negative potential. The base voltage for transistor 70 is derived from a voltage divider comprising resistors 72 and 73. Similarily, the driving circuit for the half of the electronic switch assigned to the first television signal comprises a transistor 74 having an emitter-collector circuit connected from the base of transistor 66 to one terminal of resistor 71 and a base connected to the output of a voltage divider comprising resistors 75 and 76. Transistors 70 and 74 are thus arranged as a differential pair, only one of the transistors conducting at any one time. The biasing is such that in under normal conditions transistor 74 conducts while transistor 70 is cut off. The pulse for switching the circuit to the condition wherein transistor 74 is blocked while transistor 70 conducts is applied through a capacitor 77 to the base of transistor 74. This negative pulse is derived from the output of a NAND gate 78. The first input of NAND gate 78 is derived from the output of an inverter 79 whose input is connected to the output of a monostable multivibrator 80 which has a time constant of approximately half a field. This time constant is determined by a capacitor 81 and a resistor 82. The output of monostable multivibrator 80 is normally low, but when a trigger signal is applied to its input, this output becomes a logic "1". Triggering of monostable multivibrator 8 takes place on receipt of the negative-going portion of the output of a differentiator circuit comprising a capacitor 83 and a resistor 84. The input to the differentiator circuit receives the "vertical drive" signal from synchronizing signal generator 12.

The second input of NAND gate 78 receives a signal from the output of an inverter 85. The input of inverter 85 is connected to the output of a DC clamping circuit comprising a resistor 86, diode 87, and a capacitor 88. The DC clamping circuit receives the output of switch 16, that is either the "burst flag" or the "blanking" signal.

The operation of the above-described apparatus is as follows: Under normal conditions transistor 74 is conductive, while transistor 70 is blocked. The base of transistor 65 is approximately at ground level, and since transistor 74 is conducting, the base of transistor 66 is more negative than that of transistor 65. Under these conditions, transistor 65 is conductive and the signal at its base appears as its emitter and therefore at the base of transistor 68. The first television signal is applied to the monitor. At the same time, transistor 70 is cut off, causing the base of transistor 56 to be at approximately the positive supply of voltage. Transistor 56 is therefore conductive, causing transistor 55 to be cut off. The emitter of transistor 56 is also at a relatively high potential, causing transistor 58 to be cut off. Signal transmission from terminal 50 to terminal 59a and therefore to the display means is blocked.

When a negative-going pulse appears at the base of transistor 74, this transistor cuts off, causing transistor 70 to become conductive. Since the switching is bilateral, the second television signal is now applied to the output, while transmission of the first television signal to the output is blocked.

The generation of the negative switching pulse which is applied to transistor 74 will now be discussed. For this purpose, reference will first be made to FIG. 6. FIG. 6a shows a horizontal synchronizing signal, on the back porch of which is the color burst which the system of the monitor utilizes to determine the phase of the color subcarrier. FIG. 6b shows the horizontal blanking interval, which includes the front porch of the horizontal synchronizing signal, the horizontal pulse itself and its back porch. The "blanking" output of synchronizing signal generator 12 furnishes a train of pulses which coincide with the blanking intervals.

FIG. 6c shows a negative-going pulse coinciding in time with the color burst. This is one of the pulses of the pulse train furnished at the "burst flag" output of synchronizing signal generator 12. The vertical drive signals furnished by synchronizing signal generator 12 are negative pulses extending over the vertical blanking interval. Each field contains one vertical blanking interval, whose start is marked by the leading edge of the vertical drive pulse. (see FIG. 6d). The voltage at the output of monostable multivibrator 80 is shown in line 6e. It will be noted that it goes positive in response to the leading edge of each vertical drive pulse and then returns to a negative potential after approximately half a field. Inverter 79 inverts the pulse appearing at the output of monostable multivibrator 80 and applies it to the first input of NAND gate 78.

When switch 16 is in the position shown in FIG. 2, the burst flag is applied to the input of inverter 85 which therefore furnishes a positive pulse each time the burst flag is applied. The output of NAND gate 78 is positive, except when the signals at both inputs are positive. The output of NAND gate 78 will thus be a negative pulse when the burst flag is applied to the circuit and when the signal at its first input is also positive, that is during the second half of each field. All color bursts from the second television signal which occur during the second half of each field will thus appear at the collector of transistors 58 and 68, that is will be applied to the input of the monitor. The complete first television signal will thus be applied to the monitor during the first half of the field while during the second half of the field the bursts from the first television signal will be blocked and those of the second television signal inserted instead. Under these conditions a difference in hue will occur, as discussed with reference to FIG. 3, in the display on the color monitor.

The operation of the circuit when the blanking signal is applied rather than the bursts flag is identical and will not be discussed here. If the two television signals are monochrome, application of the blanking signal will cause a horizontal shift of the upper part of the display relative to the lower part as was discussed with reference to FIG. 4. No change in hue will occur since no color bursts will be present.

The above described system can readily by modified for aligning more than two television signals. Selector switch 50a of FIG. 5 permits the operator to connect the second, third, fourth, fifth and sixth television signals to terminal 50 in turn. Each signal is phase matched to the signal applied at terminal 60 as described above and the next television signal is then applied to terminal 50. The dividing line on the screen will always be in the middle for this procedure.

An alternate embodiment of a system for phase matching a plurality of television signals to each other as shown in FIG. 7. In this embodiment a second, third and fourth television signal are to be phased matched to the first television signal. A first, second, third and fourth monostable multivibrator, 101a, 101b, 101c, and 101d are shown, the first of which is switched to the unstable state by the vertical drive signal, each subsequent one being switched to its unstable state by the trailing edge of the preceding one. The output of monostable multivibrators 101b, 101c, 101d is applied respectively, to one input of AND gates 102a, 102b, 102c. Further, the output of each monostable multivibrator is also connected to one input of an ORgate 103. The outputs of AND gates 102a, 102b, 102c are connected to respective inputs of an ORgate 104 whose output is connected to terminal 50 of FIG. 5. The output of ORgate 103 is connected to input 4 of NAND gate 78 of FIG. 5. The circuitry shown connected to this input in FIG. 5 is replaced by the above described circuit.

Each of the monostable multivibrators 101a–101d has a time constant of approximately one quarter of a field. During the first quarter of the field, the first television signal and its synchronizing signals are applied to the monitor. During the second quarter of the field, the first television signal is still being pictured on the monitor but during the burst or blanking interval, the corresponding signal from the second television signal will be applied to the monitor causing a detectable difference between the first and second quarter of the television display if the second television signal is not phase matched to the first. Similarily, during the third and fourth quarters of each field the synchronizing signals from the third and fourth television signal respectively will be applied to the monitor. The display on the monitor will then be divided into four quarters each having a slightly different hue or a relative horizontal displacement from the adjoining display portions if the television signals are not properly phase matched. The operator can then manually adjust the phase of each television signal until the whole display is uniform as to hue and horizontal placement.

While the invention has been illustrated in preferred embodiments, it is not to be limited to the circuits and structures shown since many variations thereof will be evident to one skilled in the art and are intended to be encompassed in the present invention as set forth in the following claims.

I claim:

1. In a television system having means for furnishing a first and second television signal each having video information signals adapted for display as a sequence of successive fields and each having synchronizing signals, and display means for furnishing a display having predetermined characteristic varying as a function of the phase of signals applied to said display means, a method for furnishing a visual indication of phase difference between said synchronizing signals of said first and second television signals, comprising, in combination, the steps of applying said synchronizing signals of said first television signal to said display means during a first predetermined part of each of a plurality of sequential time intervals; and blocking the application of said synchronizing signals of said first television signal to said display and applying instead the synchronizing signals of said second television signal during a second predetermined part of each of said time intervals, said sequential time intervals having a duration such that changes of said predetermined characteristic of said display caused by changing from said synchronizing signals of said first to said synchronizing signals of said second television signal cause visible changes in said display.

2. A method as set forth in claim 1, wherein said display means comprises monitoring means for furnishing a display of video information signals under control of synchronizing signals applied thereto; wherein said sequential time intervals comprise a plurality of successive fields of said television signals; further comprising the step of applying said video information signals of said first television signal to said monitoring means throughout each of said successive time intervals, whereby a visually detectable difference is created between a first and second part of said display corresponding, respectively, to said first and second part of said plurality of successive fields if a phase difference exists between said synchronizing signals of said first and second television signals.

3. A method as set forth in claim 2, wherein said synchronizing signals are horizontal synchronizing signals; and wherein said visually detectable difference is a horizontal shift between said first and second part of said display.

4. A method as set forth in claim 2, wherein said synchronizing signals are color bursts; and wherein said visually detectable difference is a difference in hue.

5. A method is set forth in claim 2, wherein said television system further comprises means for adjusting the phase of said synchronizing signals of a selected one of said television signals; and wherein said method further comprises the step of adjusting said phase of said synchronizing signals of said selected one of said television signals in a direction decreasing said visually detectable difference.

6. A method is set forth in claim 2, wherein said television system has means for furnishing a first, second and third television signal; wherein said step of blocking the application of synchronizing signals of said first television signal to said monitoring means comprises the step of blocking the application of said synchronizing signals during a second and third predetermined part of a plurality of successive fields; and wherein the step of applying said synchronizing signals of said second television signal during said second predetermined part of said plurality of successive fields comprises applying said synchronizing signals of said second and third television signal to said monitoring means during said predetermined second and third parts of said plurality of fields respectively.

7. A method as set forth in claim 1, wherein said synchronizing signals are the color bursts and the horizontal synchronizing signals; and wherein said visually detectable difference is the hue if a phase difference exists between color bursts of said first and second television signal, and a horizontal shift if a phase difference exists between said horizontal synchronizing signals of said first and second television signal.

8. Television phase matching system, comprising, in combination, means for furnishing a first and second television signal each having video information signals adapted for display as a sequence of successive fields and synchronizing signals; display means for furnishing a display having a predetermined characteristic varying as a function of the phase of signals applied to said display means; and connecting means connected to said means for furnishing a first and second television signal and said display means, for applying synchronizing signals of said first television signal to said display means during a first predetermined part of a plurality of successive time intervals, and blocking the application of said synchronizing signals of said first television signal to said display means during a second predetermined part of each of said time intervals and applying instead said synchronizing signals of said second television signal, each of said successive time intervals having a duration such that changes of said predetermined characteristic of said display caused by changing from said synchronizing signals of said first to said synchronizing signals of said second television signal cause visible changes in said display.

9. Apparatus as set forth in claim 8, wherein said display means comprises monitoring means for furnishing a display of video information signals under control of synchronizing signals applied thereto; wherein each of said successive time intervals is a field of said television signals; and wherein said connecting means comprises means for applying said video information signals of said first television signal to said monitoring means during said first and second parts of said plurality of successive fields, whereby a visually detectable difference is created between a first and second part of said display corresponding, respectively, to said first and second predetermined parts of said successive fields if a phase difference exists between said synchronizing signals of said first and second television signal.

10. Apparatus as set forth in claim 9, wherein said synchronizing signals are horizontal synchronizing signals; and wherein said visually detectable difference is a horizontal shift of said second part of said display relative to said first part.

11. Apparatus as set forth in claim 9, wherein said television signals are color television signals; wherein said synchronizing signals are color bursts; and wherein said visually detectable difference is a difference in hue.

12. Apparatus as set forth in claim 8, wherein said means for furnishing a first and second television signal comprises means for furnishing a first sequence of video information signals, means for furnishing a second sequence of video information signals, and synchronizing signal generator means for furnishing a first and second sequence of synchronizing signals and applying same to said first and second sequence of video information signals respectively, said synchronizing signal generator means further having manually operable phase adjustment means for adjusting the phase of said second sequence of synchronizing signals relative to first said first sequence of synchronizing signals, whereby manual operation of said phase adjustment means in a direction decreasing said visually detectable difference decreases the phase shift between said first and second sequence of synchronizing signals.

13. Apparatus as set forth in claim 8, wherein said display means comprises a vectorscope and wherein said predetermined characteristic is the position of a spot on the screen of said vectorscope.

14. In a television system having a first and second source of video signals, means for applying synchronizing signals to said first and second video signals thereby creating a first and second composite television signal, means located at a distance from said first and second source for combining said first and second composite television signal, and display means for furnishing a visual display having a predetermined characteristic changing in dependence upon the phase of synchronizing signals applied thereto, apparatus for equalizing the phase of said synchronizing signals in said first and second composite television signal at said predetermined distance from said first and second source comprising
    switching circuit means having a first input connected to receive said first composite television signal, a second input connected to receive said second composite television signal, an output connected to said display means and a control input for transmitting said first and second composite television signal to said output in the absence and presence, respectively, of a control signal at said control input; and means connectable to said synchronizing signal generator means for furnishing said control signal to said control input only in the presence of one of said synchronizing signals during a predetermined part of each frame of said composite television signals, whereby a visually detectable difference in said display is indicative of phase shift between said synchronizing signals in said first and second composite television signals.

15. A television system as set forth in claim 14, further comprising a third source of video signals;
    wherein said synchronizing signal generator means further comprises means for furnishing synchronizing signals to said third source of video signals thereby creating a third composite television signal;
    and wherein said switching circuit means further comprises selector switch means for alternately connecting said second and third composite television signal to said second input.

* * * * *